United States Patent [19]

Begemann et al.

[11] 3,853,996

[45] Dec. 10, 1974

[54] PROCESS FOR ENHANCING A FRESH CHEESE FLAVOR IN FOODS

[75] Inventors: Willem Johan Begemann, Den Haag; Pieter Daniel Harkes, Vlaardingen, both of Netherlands

[73] Assignee: Lever Brothers Company, New York, N.Y.

[22] Filed: Apr. 13, 1973

[21] Appl. No.: 351,044

[30] Foreign Application Priority Data
Apr. 14, 1972   Netherlands....................... 7217430

[52] U.S. Cl..................... 426/65, 426/175, 426/361
[51] Int. Cl............................................. A23l 1/26
[58] Field of Search ............ 426/36, 38, 39, 40, 65, 426/150, 175, 185, 187, 188, 189, 221, 222, 356, 361

[56] References Cited
UNITED STATES PATENTS
3,635,737   1/1972   Baron ................................ 426/222

OTHER PUBLICATIONS
Chemical Abstracts, Vol. 78, 1973, pg. 374 para. 28086S.

Primary Examiner—Raymond N. Jones
Assistant Examiner—R. Yoncoskie
Attorney, Agent, or Firm—Lever Brothers Company

[57] ABSTRACT

A fresh cheese flavor is given to a food-product by the addition of an acid of the general formula R.CHOH.COOH where R is a $C_2$ to $C_8$ branched-chain alkyl or a $C_7$ or $C_8$ phenylalkyl group. Addition of the acid is particularly useful when the food-product is pasteurized or is a fresh cheese made by souring with lactic acid.

7 Claims, No Drawings

PROCESS FOR ENHANCING A FRESH CHEESE FLAVOR IN FOODS

The invention relates to a process for flavouring food products with the flavour of cheese, in particular with the flavour of fresh cheese.

BACKGROUND TO THE INVENTION

A number of detailed publications (see for instance Schonmuller and Langner Z. Lebensmittel Unters. und Forsch. 1960, 113, 289) have reported investigations into the minor components of cheese, including fresh cheeses. Hundreds of minor components have been reported, including numerous organic acids. Lactic acid is, in the context of the present invention, the most relevant.

It has now been found that certain other alphahydroxy carboxylic acids occur in very small amounts in cheeses, particularly in fresh cheeses. Examples are 2-hydroxy-3-methylbutanoic acid and 2-hydroxy-4-methylpentanoic acid. It has further been found that these alphahydroxy carboxylic acids are examples of a general class of compounds whose addition in adequate amounts, singly or mixed, to food products gives a flavour of fresh cheese to the products. The general class are compounds of the general formula R.CHOH.COOH where R is a $C_2$ to $C_8$ branched-chain alkyl or a $C_7$ or $C_8$ phenyl-alkyl group.

THE INVENTION

The invention therefore provides a process for enhancing the cheese-like, in particular the fresh cheese-like, flavour of a food in which a carboxylic acid of the general formula R.CHOH.COOH, where R is a $C_2$ to $C_8$ branched-chain alkyl or a $C_7$ or $C_8$ phenyl-alkyl group, is added to the food.

Of course the amount of the carboxylic acid added to the food product must be such as to give the required flavour to the product. This amount will vary depending on the type of food, on the particular acid and indeed on the taste of the consumers for whom the product is intended. But as a guide the amount should preferably be such that the total amount of R.CHOH.COOH in the food is between 50 and 2,000 mg/kg, preferably between 150 and 1,000 mg/kg. The acid should preferably be added as the free acid, but salts can be used. The acid can be added at any suitable stage.

Examples of acids that can be used include alpha-hydroxy-beta-phenyl-propionic acid. Preferred acids are branched-chain aliphatic acids, in particular alpha-hydroxy-iso-butyric acid, alpha-hydroxy-iso-valeric acid and alpha-hydroxy-iso-caproic acid. Acids of the general formula R.CHOH.COOH can be prepared by many standard methods. Examples of preparative methods are those given in the following patent specifications: US Pat. No. 3,449,385, Austrian Pat. No. 260,200, British Pat. No. 839,831, Canadian Pat. No. 465,270 and West German Pat. No. 919,466.

Advantageously glycine is also added to the food. The effect of glycine and R.CHOH.COOH on the fresh-cheese flavour of the food is surprisingly good. The weight-ratio of glycine to R.CHOH.COOH should preferably be between 0.5 : 1 and 1.5 : 1. Known ingredients of flavour-cocktails, such as lactic acid, succinic acid, diacetyl and acetaldehyde can also be added.

Conventionally fresh cheese is prepared by microbiological souring of (skimmed) milk. There is such a demand for fresh cheese products that production on a large scale is necessary. But particularly in large scale production problems arise with microbiological souring. For instance, the results are often unreproducible and flavour defects can occur. The milk can be soured by the addition of acids, for instance by the addition of lactic acid. A disadvantage is that the fresh cheese obtained does not have the required flavour.

Use of the present invention provides an appropriate flavour. The invention is therefore particularly applicable to a fresh cheese obtained by non-microbiological souring.

In the production of processed cheese or pasteurized cheese flavour components are often detrimentally affected. Use of the present invention enables such cheeses with a flavour of fresh cheese to be obtained.

The present invention is applicable to the enhancement of the flavour of fresh cheeses. Fresh cheeses are in general fresh sour milk cheese which have not undergone further ripening. Examples or other terms for the same product are quark, Frischkase and cottage cheese.

The invention will now be illustrated by the following examples.

The following flavour compositions were prepared

|  | Comp. A | Ex. I | Ex. II |
| --- | --- | --- | --- |
| Lactic Acid | 5 g | 5 g | 7.5 |
| Succinic Acid | 5 g | — | — |
| Alpha-Hydroxy-iso-Butyric Acid | — | 5 g | — |
| Glycine | 5 g | 5 g | — |
| Alpha-Hydroxy iso-Caproic Acid | — | — | 2.5 g |
| Diacetyl | 15 mg | 15 mg | 15 mg |
| Acetaldehyde | 20 mg | 20 mg | 20 mg |
| Water | 15 g | 15 | 15 g |

Comp. A and Example I were dosed into quark at 2.4 ml/kg and Example II at 2 ml/kg. Examples I and II gave a better fresh cheese flavour than Comp. A.

The following three flavour compositions gave excellent fresh cheese flavours when incorporated in soft processed cheese.

|  | Ex. III | Ex. IV | Ex. V |
| --- | --- | --- | --- |
| Acetic Acid | 1000 | 1000 | 1000 |
| Lactic Acid | 1000 | 1000 | 400 |
| Citric Acid | — | — | 200 |
| Alpha-Hydroxy-iso-Butyric Acid | 1000 | — | — |
| Alpha-Hydroxy-iso-Caproic Acid | — | 500 | 200 |
| Acetaldehyde | 10 | 10 | 10 |
| Diacetyl | 3 | 3 | — |
| Penta-2,3-Dione | 100 | 100 | 100 |
| Propionic Acid | — | — | 5 |
| Pentan-2-one | 2 | 2 | — |
| Heptan-2-one | 2 | 2 | — |
| Water | 883 | 1383 | 985 |
| Total | 4 g | 4 g | 4 g |

EXAMPLE VI

Whole milk was heated to 85°C, acidified with a 10% solution of lactic acid to pH 4.6 and filtered. 1% common salt and a flavour composition containing alphahydroxy-iso-butyric acid (70 mg/kg pressed curd) were then added to the curd obtained. The curd was then pressed to exude whey, formed into fingers, coated with batter and deep-fried at about 200°C. A product with improved flavour of fresh cheese was obtained.

COMPARATIVE TEST

Addition of alpha-hydroxy-butyric acid to a milk-product gave a taste which was unacceptable to an experienced panel; the taste was most unlike that of fresh cheese. Addition of alpha-hydroxy-valeric acid and of alpha-hydroxy-caproic acid did not enhance or impart a fresh cheese flavour to the milk-product.

What is claimed is:

1. A process for enhancing or imparting a fresh cheese flavour to a food-product in which an alpha-hydroxy mono-carboxylic acid of the general formula R.CHOH.COOH, where R is a branched-chain $C_2$ to $C_8$ alkyl or a $C_7$ or $C_8$ phenylalkyl group, is added to the food-product to give between 50 and 2,000 mg/kg of the acid in the food-product.

2. A process as claimed in claim 1 in which the acid has the general formula R.CHOH.COOH where R is a $C_2$ to $C_8$ branched-chain alkyl group.

3. A process as claimed in claim 2 in which the acid is alpha-hydroxy-iso-butyric acid.

4. A process as claimed in claim 2 in which the acid is alpha-hydroxy-iso-caproic acid.

5. A process as claimed in claim 1 in which glycine is also added, the weight-ratio of added glycine to the acid of general formula R.CHOH.COOH in the product being between 0.5 : 1 and 1.5 : 1.

6. A process as claimed in claim 1 in which the alpha-hydroxy mono-carboxylic acid of the general formula R.CHOH.COOH, where R is a branched-chain $C_2$ to $C_8$ alkyl group, is added to impart a fresh cheese flavour to cheese made by souring milk with lactic acid.

7. A process as claimed in claim 1 in which the alpha-hydroxy mono-carboxylic acid of the general formula R.CHOH.COOH, where R is a branched-chain $C_2$ to $C_8$ alkyl group, is added to impart a fresh cheese flavour to processed cheese.

* * * * *